Patented Mar. 18, 1941

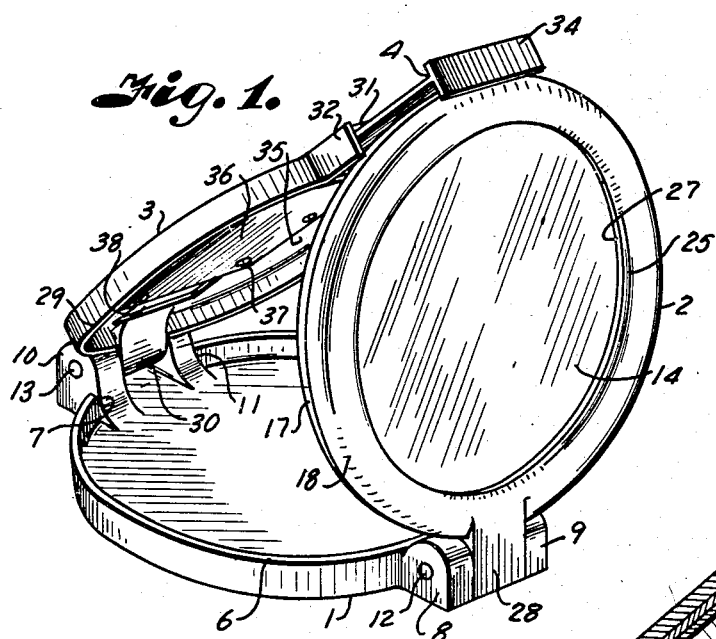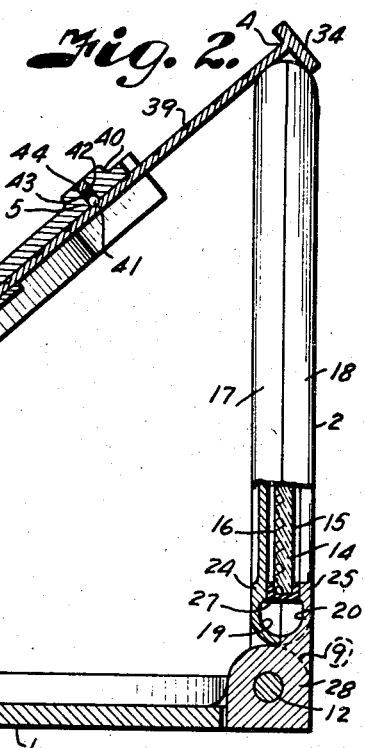

2,235,281

UNITED STATES PATENT OFFICE 2,235,281

SIGNALING DEVICE

Horace N. Carver, Wichita, Kans.

Application April 21, 1938, Serial No. 203,343

4 Claims. (Cl. 88—78)

This invention relates to signaling devices and more particularly to a portable signal adapted to be conveniently placed on highways and similar thoroughfares for warning motorists and the like of obstructions on a highway.

It is ordinarily difficult for operators of vehicles such as loaded trucks to pull off the road when it becomes necessary to make repairs on the vehicles under their control. Should the motor of a truck fail or the tires need changing, the stalled or otherwise stationary vehicle creates a hazard on the road, not only to approaching motorists, but also to the truck operators and the property under their control.

It is the principal object of the present invention to provide a signal of the character commonly known as a "road flare" which is capable of reflecting and/or refracting light rays generated by the lights of approaching vehicles, back approximate their source of incidence to warn the occupants of those vehicles of the presence of obstructions on roads.

Other important objects of the present invention are to provide a collapsible light reflecting and/or refracting signal of sturdy and durable construction capable of withstanding shocks and jars without damage to the signal; to so design the signal that it is difficult to tip over accidently; to provide a housing for the reflector or refracting element of the signal which also acts as a supporting standard therefor; to provide a compact and easily operable signal having a high degree of efficiency; to provide a protective mounting for the reflector or light refracting element of the signal; to provide a cover for the signaling element adapted to maintain the signaling element in erected condition when in open position; to provide for locking the cover and signaling element in erected condition; to provide for adjusting the signaling element at various angles relative to the base; and to provide improved parts and arrangements of parts making up a signaling device according to the present invention.

In accomplishing these and other objects of the present invention, I have provided improved details of structure, the preferred form of which is illustrated in the accompanying drawing, wherein:

Fig. 1 is a perspective view of a signaling device embodying the features of the present invention and showing the device in erected condition.

Fig. 2 is a vertical cross-section through the base and cover elements, part of the signaling element frame being broken away to better illustrate its construction.

Fig. 3 is a fragmentary detail vertical cross-section through a portion of the signaling element.

Fig. 4 is a perspective view of the signaling device showing the same in collapsed condition to facilitate storage and transportation thereof.

Fig. 5 is a fragmentary detail horizontal cross-section through the free end of the cover particularly illustrating the arrangement of the extension therein.

Fig. 6 is a longitudinal cross-section through the signaling device on the line 6—6, Fig. 4.

Referring more in detail to the drawing:

The invention generally includes a base 1, a signaling element 2 pivotally mounted on the base and adapted to seat therein when in closed position, and a cover member 3 adapted to mate with the base in overlapping relation to the signaling element for enclosing the signaling element, an extension 4 being provided on the cover and adapted to engage a portion of the signaling element to hold the same in erected or opened condition and adapted to be locked in such condition by a locking device 5 on the cover engageable with the extension.

More particularly, the base 1 includes a plate which may be cast or otherwise formed preferably of substantially circular shape and having a substantially continuous peripheral upwardly turned flange 6 having oppositely disposed recesses 7 therein. Oppositely disposed pairs of spaced ears 8—9 and 10—11 bound the recesses and extend laterally and upwardly from the periphery of the base, the ears having aligned openings therein for passing pivot pins 12 and 13.

The signaling element 2, Fig. 3, preferably comprises a plate 14 formed of colored rolled glass or similar substantially transparent material having a suitable outer face 15 and preferably a prismatic inner face 16 for reflecting and/or refracting light rays impinging against the outer face of the signaling element back approximate their sources of incidence. The edges of the signaling element plate 14 are mounted within mating frame members 17 and 18, Fig. 3, which are preferably of substantially circular or ring-shape and of a size adapting them for fitting within the flange 6 of the base plate. The frames each preferably have concave inner surfaces 19 and 20 provided with spaced alignable bosses 21 and 22 which, in practice, initiate substantially at the edges 23, Fig. 3, of the frame concavities in such a manner that they are adapted for engagement by a corresponding boss on the other frame.

The bosses 21 and 22 terminate short of the edges 23 of the frame concavities to form a seat for the peripheral edge of the signal plate 14. The outer side edges of the plate are arranged for engagement by the edges 24 and 25 of the frames to secure the plate in operative condition within the frame. The signal plate frames may be secured together in a suitable manner as by the extension of fastening devices 26 through aligned apertures in the frame, as illustrated in Fig. 3.

As a matter of practice, it is also desirable to provide a gasket 27 in interposed relation between the peripheral edge of the signaling plate 14 and the inside edges of the signaling plate frame for cushioning the signal plate relative to its support and thereby permit relatively rough treatment of the assembled device without danger of breaking the plate.

A boss 28 is provided on the frame which extends outwardly from the periphery thereof and which is of sufficient thickness to snugly seat in the recess between the base ears 8 and 9. The boss 28 is also provided with an opening alignable with the openings in the ears 10 and 11 in such a manner that the pivot pin may be passed therethrough for pivoting the signaling element on the base.

It is also preferable that the lower faces of the ears 8 to 10 be flush with the lower face of the base to increase the bearing surface of the signaling device on a support when being used for its intended purpose.

The cover plate 3 preferably is formed as a substantial duplicate to the base plate 6, a peripheral flange 29 being provided on the cover which extends downwardly therefrom and is adapted to rest upon the upper peripheral edge of the flange 6 of the base plate 1 to completely enclose the signaling element 2 when the device is collapsed or in closed condition. The cover 3 is, however, preferably provided with a boss 30 at one end thereof of a size adapting it for snug fit within the space 7 between the ears 10 and 11 of the base plate, an opening being provided therethrough alignable with the openings of the ears 8 and 9 for the passage of the pivot pin 13 to pivot or mount the cover on the base. The opposite end of the cover is provided with a laterally extending flange 31 terminating short of flange extensions 32 and 33 of the flange 29 on the cover to provide a seat for a lug 34 of a size and shape adapting it to seat between the flange extensions 32 and 33. The lug 34 is mounted at the outer end of the extension 4, which extension preferably consists of a plate slidably mounted on the underface 35 of the cover and retained in such sliding relation by a plate 36 fixed as by fastening devices 37, Fig. 1, to the underface of the cover to provide a channel 38 in which the extension 4 is slidably mounted.

In order to retain the extension 4 in desired extended position, the upper face thereof is provided with a series of depressions 39. The cover is provided preferably on the flange 31 thereof with a boss 40 which is bored to receive the locking device 5, the locking device preferably consisting of a ball 41 adapted to seat in any of the depressions 39 and having seating engagement in a bore 41 in the boss 40. A spring 43 is also mounted in the boss and engaged with the ball to normally urge the ball into positive engagement with any of the recesses. A lug 44 retains the spring and ball in the bore of the boss 40 in cooperation with the extension 4.

The operation of a signaling device constructed as described is as follows:

Assuming the signaling device to be in the condition illustrated in Fig. 4, the cover member 3 is raised as by swinging it upwardly on its pivot pin 13. The signaling element is then swung upwardly in the opposite direction on the hinge pin 12 to an upright condition, as shown in Figs. 1 and 2. Assuming that the road on which the device is to be placed is substantially level, the signaling element is positioned at substantially right angles to the base. In such a condition the cover is normally of insufficient length to adequately engage the signaling element and the extension is then withdrawn from the channel 38 in such a manner as to adapt the lug 34 for engagement over the periphery of the signaling element frame. The extension is automatically locked in such position by engagement of the spring-pressed ball in one of the recesses of the extension 4.

Should it be desirable to position the signaling device on a road, for example, in a valley where traffic is approaching on a down-grade, the extension 4 is retracted into its channel 38 to a point at which engagement of the lug 34 with the periphery of the signaling element positions the signaling element at an angle to the perpendicular and whereby the signaling plate may be at substantially right angles to rays of light issuing from the headlights of oncoming vehicles.

If the signaling device is to be placed at the crest of a hill in such a manner that it faces traffic approaching on an up-grade, the extension is moved out of the channel 38 a greater distance than shown in Fig. 2 in such a manner that the signaling element is at a greater than 90° angle to the base 1. Such a position of the signaling element may be varied to position the signaling plate at substantially right angles to rays of light emanating from vehicle headlights approaching on the up-grade.

When the signaling device has served its purpose, the cover member is hinged outwardly relative to the base to permit the signaling element to be hinged inwardly relative to the base and the cover is then hinged toward the base in overlapping relation to the signaling element for completely enclosing the signaling element and forming a protective housing therefor.

It is believed apparent that the present device may be placed either in front of or behind a vehicle on a road and that the signaling plate may be faced toward either direction of approaching traffic on the highway or the like to warn the occupants of vehicles of the presence of an obstruction on the highway.

The principal advantages of a signaling device embodying the features of the present invention are that it is strong, rigid, durable, and withstands rough treatment. The device is compact and may be conveniently stored in any type of vehicle. Light rays are reflected or refracted in intensified form within a wide range of angles of incidence of such light rays. Further, the signaling element is protected from normal deterioration due to its being enclosed when in collapsed condition.

What I claim and desire to secure by Letters Patent is:

1. A road signal comprising a base, a frame adapted to carry a signaling element pivotally mounted on said base on an axis substantially parallel thereto, a cover pivotally mounted on the base on an axis substantially parallel thereto in spaced relation to the axis of the frame, an extension slidably mounted on the cover in angular relation to the pivotal axis thereof adapted to hook over an edge of the frame when the same is pivoted outwardly relative to the base and retain the same in outwardly pivoted condition, and interengageable means on the cover and extension forming a lock to hold the extension in extended position.

2. A road signal comprising a base, a frame adapted to carry a signaling element pivotally mounted on said base on an axis substantially parallel thereto, a cover pivotally mounted on the base on an axis substantially parallel thereto in spaced relation to the axis of the frame, and an extension mounted on the cover member in angular relation to the pivotal axis thereof adapted to bridge the space between edges of the cover and signaling element when the same are pivoted outwardly relative to said base and to hook over an edge of the signaling element and retain the same against pivotal movement.

3. A road signal comprising a pair of hinged mating members forming a housing when in closed position, a frame adapted to carry a signaling element arranged between said members when in closed position, means hinging together one of said mating members and said frame in spaced relation to the hinge connection between the mating members whereby the free ends of the frame and the other mating member are spaced from each other when in opened condition, means on said other mating member adapted to be extended to bridge said space and hook over the frame to retain the same against hinging movement, and interengageable means on the extensible means and its supporting mating member forming a lock to hold the extensible means in extended position.

4. A road signal of the character described including a base having a peripheral flange and oppositely disposed bosses, a frame adapted to carry a signaling element snugly fitting within said base and pivotally mounted on one of said bosses, a cover adapted to mate with the base to enclose the frame and pivotally engaged with the other of said bosses, a plate on the cover spaced therefrom to provide a channel therebetween, an extension slidably mounted in the channel having a lug engageable over a portion of the free edge of said frame when in opened condition to retain the frame in raised condition relative to the base, the extension having spaced depressions, and a spring-pressed ball mounted in the cover engageable with the respective depressions for locking the extension in desired angular position relative to the base.

HORACE N. CARVER.